Nov. 23, 1965 E. D. WISEMAN 3,219,795
ELECTRICALLY HEATED HUMIDIFIER
Filed March 13, 1962 3 Sheets-Sheet 1
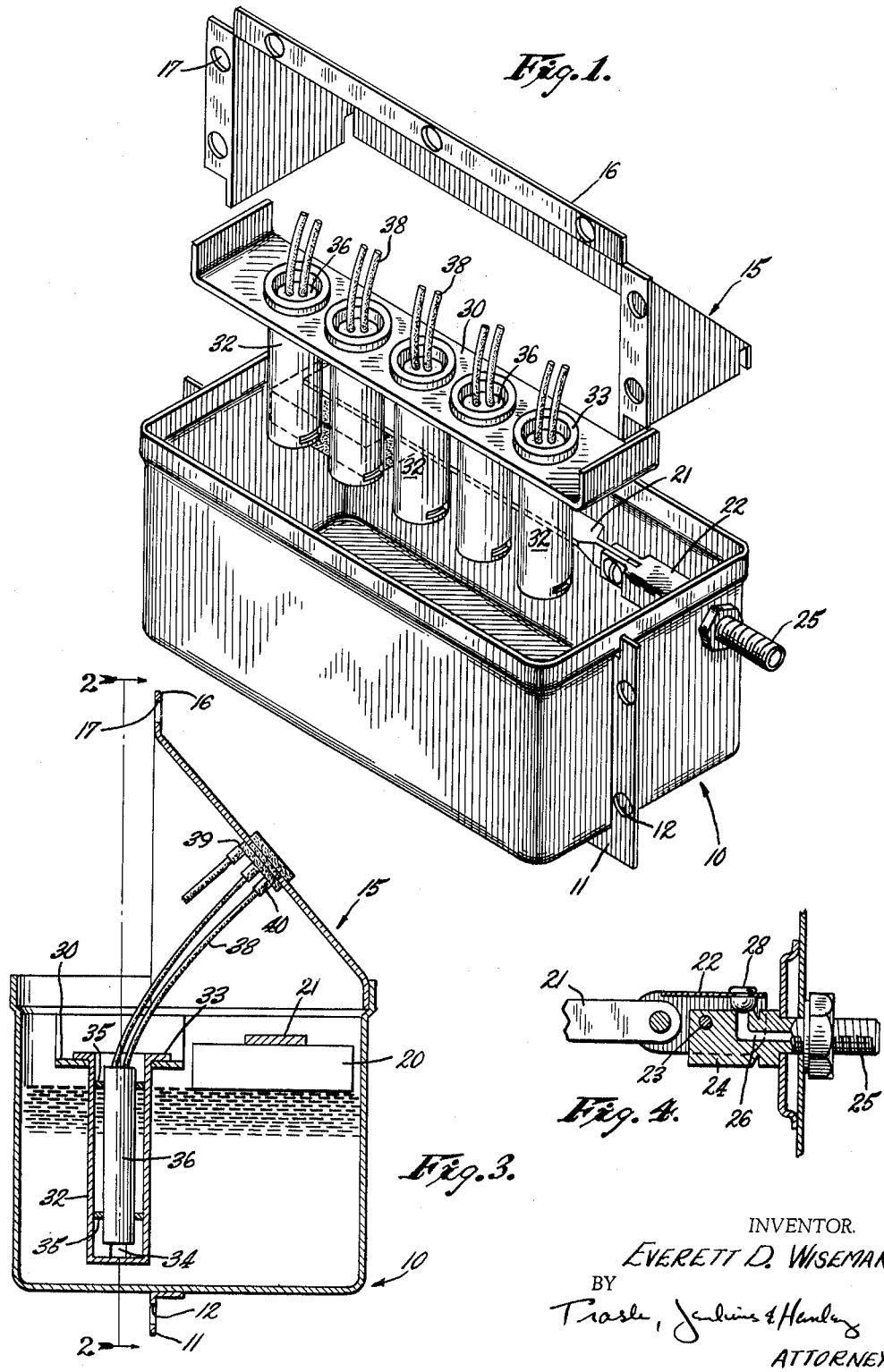
INVENTOR.
EVERETT D. WISEMAN,
BY
Trask, Jenkins & Henley
ATTORNEYS.

Nov. 23, 1965  E. D. WISEMAN  3,219,795
ELECTRICALLY HEATED HUMIDIFIER
Filed March 13, 1962  3 Sheets-Sheet 2
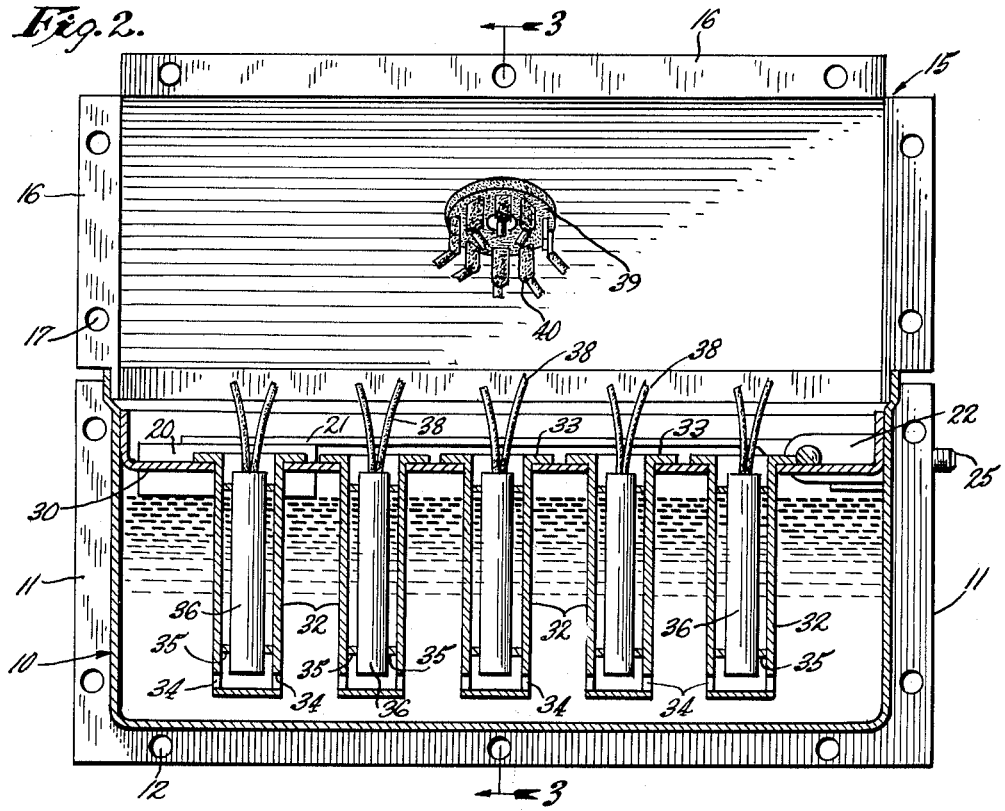
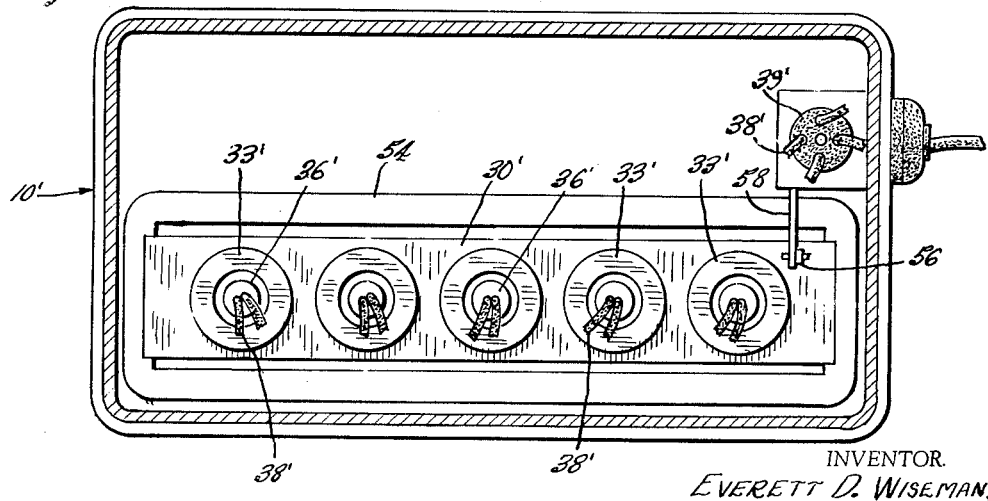
INVENTOR.
EVERETT D. WISEMAN,
BY
ATTORNEYS.

Nov. 23, 1965 E. D. WISEMAN 3,219,795
ELECTRICALLY HEATED HUMIDIFIER
Filed March 13, 1962 3 Sheets-Sheet 3
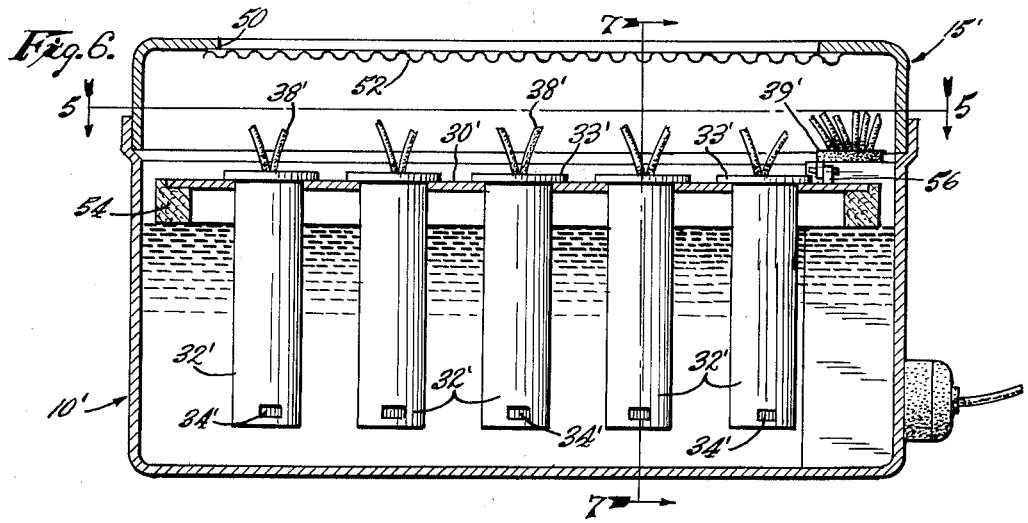
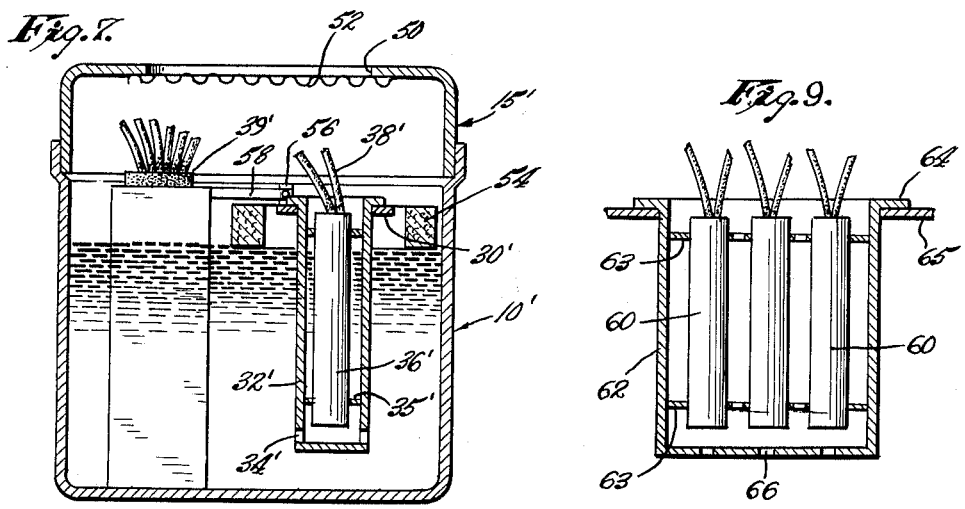
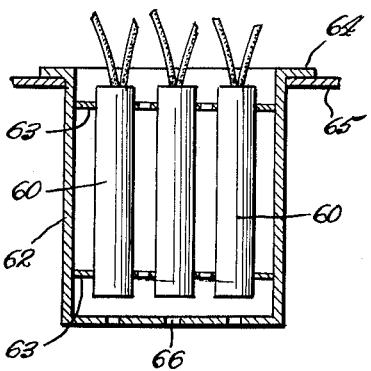
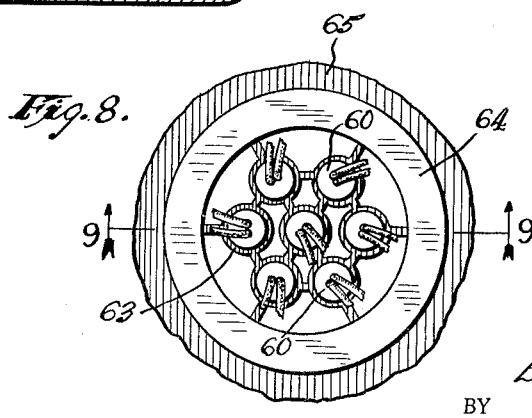
INVENTOR.
EVERETT D. WISEMAN,
BY
ATTORNEYS.

United States Patent Office 3,219,795
Patented Nov. 23, 1965

3,219,795
ELECTRICALLY HEATED HUMIDIFIER
Everett D. Wiseman, Columbus, Ind., assignor to Vernco Corporation, Columbus, Ind., a corporation of Indiana
Filed Mar. 13, 1962, Ser. No. 179,438
1 Claim. (Cl. 219—275)

This invention relates to a humidifier, and more particularly to a vaporizing humidifier.

The vaporizing humidifiers heretofore available have employed electrical resistance heating elements which are disposed in a relatively large body of water. This requires the heating element to bring substantially the entire body of water up to temperature before vaporization can occur with the results that it takes the humidifier a relatively long time to start vaporizing the water and it requires the use of a high wattage heating element.

It is thus the general object of my invention to provide a vaporizing humidifier which will overcome these difficulties and disadvantages of the prior vaporizing humidifiers. More specifically it is an object of my invention to provide a vaporizing humidifier which can be simply and economically manufactured, which may be of a compact size yet have a high vaporizing capacity, which will have a rapid start-up, and which will be simple and economical to use.

In accordance with one form of my invention, there is provided a water tank adapted to be maintained at a substantially constant water level and open at its upper end for the discharge of water vapor therefrom. A plurality of heating elements are carried in said water tank and are disposed within jacket means separating said heating elements from the main body of water carried in said tank. Said heating elements are disposed in proximate relation to the inner walls of said jacket means with said jacket means having open upper and lower ends respectively disposed above and below the water level in the tank. In this manner, the main body of water in the tank is separated from the heating element, but the water gradually flows into the open lower end of the jacket means between said jacket means and heating elements where it is heated and vaporized, the vapor exiting through the open upper end of said jacket means for discharge from the humidifier.

Other objects and features of my invention will become apparent from the detailed description which follows and from the accompanying drawings, in which:

FIG. 1 is an exploded perspective view of a humidifier embodying my invention;

FIG. 2 is a vertical section of the humidifier shown in FIG. 1 and taken on the line 2—2 of FIG. 3;

FIG. 3 is a vertical section taken on the line 3—3 of FIG. 2;

FIG. 4 is an enlarged fragmentary vertical section of the water flow regulator shown in FIG. 1;

FIG. 5 is a horizontal section taken on the line 5—5 of FIG. 6 and showing a modified form of my invention adapted for portable use;

FIG. 6 is a vertical section of the humidifier shown in FIG. 5;

FIG. 7 is a vertical section taken on the line 7—7 of FIG. 6;

FIG. 8 is a plan view of a modified form of my heating element assembly; and

FIG. 9 is a vertical section taken on the line 9—9 of FIG. 10.

The embodiment of my humidifier illustrated in FIGS. 1–4 is adapted to be employed in a conventional hot-air heating system for raising the relative humidity in said system. This embodiment of my humidifier may be connected to either the hot-air or cold-air return ducts of conventional hot-air furnaces, and comprises a water tank 10 open at the top and provided with outwardly projecting flanges 11 having openings 12 for the reception of screws or other fastening means for connecting said water tank to a furnace duct, with said tank being recessedly mounted in an opening cut in said duct. A cover 15 is received over the upper open end of the tank 10 and is also provided with flanges 16 having openings 17 for the reception of screws or other fastening means for connecting the cover to the furnace duct around the duct opening in which the tank is received. As shown in FIG. 3, the cover 15 extends only partially over the open upper end of the tank 10 whereby said tank will be in open communication with the interior of the duct to which said tank and cover are connected.

The water level in the tank 10 is maintained at a relatively constant level by the float assembly illustrated in FIGS. 2 and 4. As shown, such assembly comprises a float 20 connected to one end of an arm 21, with the opposite end of said arm being connected to a bracket 22 pivotally mounted, as at 23, to a coupling 24. The coupling 24 is connected to a water supply source 25 and is provided with a water passage 26 closable by a valve 28 mounted on the bracket 22. When the water level in the tank 10 drops, the float 20 riding on the surface of the water will cause the arm 21 to swing downwardly about the pivot 23 to dispose the valve 28 in open position with respect to the passage 26 to permit water to flow through said passage in the tank 10. Conversely, if the water level raises, the float 20 will cause the arm 21 to pivot about the pivot 23 and the valve 28 will seat against the upper end of the passage 26 to prevent additional water from entering the tank 10.

In the embodiment shown in FIGS. 1–4, there is provided a plate 30 connected to a pair of opposed side walls of the tank 10 above the water level in said tank. A plurality of openings are formed in the plate 30 in which a plurality of jackets 32 are carried, said jackets having shoulders 33 at their upper ends supported on the upper face of the plate 30 for retaining the jackets on said plate. The upper ends of the jackets 32 are open, and the lower ends of said jackets have openings 34 whereby the water in the tank 10 may flow into said jackets. Carried within each of the jackets 32 on spiders 35 is an electrical resistance heating element 36. As shown in FIGS. 2 and 3, each of the heating elements 36 is closely spaced to the inner wall of its associated jacket 32 with the water entering the jackets through the openings 34 filling the space between the heating elements 36 and the jackets 32. Each of the jackets 32 forms an insulating thermal barrier around its respective heating element 36 so that each of said heating elements heats substantially only the water disposed between it and its surrounding jacket 32. Preferably, the jackets 32 are formed from a heat-insulating material to increase their effectiveness as an insulating thermal barrier between the main body of water and the water interposed between them and their respective heating elements. With only the relatively small amount of water disposed between the heating elements 36 and their jackets 32 being heated, each of said heating elements will quickly raise the temperature of said water to boiling to thus provide a quick start-up of the unit. As the water between elements 36 and jackets 32 is vaporized and discharged out of the tank into the duct opening in which the tank is mounted, it is constantly replaced by the main body of water in the tank 10 flowing into the jackets 32 through the openings 34.

As shown in FIGS. 2 and 3, the electrical leads 38 for the elements 36 are connected to a junction plug 39 mounted in the cover 15 and connected to a source of electrical power. Conveniently, the plug 39 may be connected to the power source through a humidistat (not shown) for thus controlling the on-off cycles of the heating elements 36 to produce the desired vaporization and humidity. When the humidifier is in operation, the air in the entire upper portion of the humidifier is saturated, and thus all of the leads 38 are water-proof and their connections to the plug 39 are water-proofed as by the sleves 40, one of said sleeves being removed from FIG. 2 to show the lead-plug connection.

My humidifier may also be employed as a portable humidifier as illustrated in FIGS. 5–7 in which there is provided a water tank 10' having an open upper end. Conveniently, a cover 15' is disposed over the upper end of the tank 10' and is provided with an enlarged opening 50 having a protective screen 52 extending thereover.

The tank 10' holds the water which is to be vaporized, and floating on the surface of said water is a buoyant ring 54 formed of cork, Styrofoam, or the like. An apertured plate 30' is mounted on the ring 54 and extends thereacross with a plurality of elongated jackets 32' being disposed in the openings in said plate, said jackets having outwardly projecting shoulders 33' at their upper ends received on the plate 30' for supporting the jackets therefrom. The jackets 32' have open upper ends and are provided with openings 34' at their lower ends whereby the water in the tank 10' is free to move into each of said jackets. An electrical resistance heating element 36' is mounted within each of the jackets 32' as by spiders 35', to dispose each of the elements 36' in closely spaced relation to its associated jacket 32'. Each of the heating elements 36' is connected as by leads 38' through a terminal plug 39' to a source of electrical power.

Each of the elements 36' vaporizes the water interposed between it and its associated jacket 32' with said vaporized water leaving the unit through the open upper ends of the jackets 32' and the screen 52. As the water between the heating elements and their associated jackets is vaporized, it is continually replaced by water entering the jackets 32' through the openings 34' to thus cause the water level in the tank 10' to gradually be lowered. To prevent the plate 30' from pulling away from the jacket flanges 33' as the water level is dropped beyond a point where the bottoms of the jackets 32' rest on the bottom of the tank 10', a cut-off switch of any convenient construction may be employed. To this end, I mount a stud 56 on the plate 30' and pivotally connect said stud to an actuating arm 58 for opening the electrical circuit between the junction plug 39' and the power supply for the elements 36'.

A modified form of the heating element and jacket assembly is illustrated in FIGS. 9 and 10. In such modification, a plurality of heating elements 60 are mounted within a single jacket 62 on spiders 63. The jacket 62 has an open upper end provided with an outwardly projecting flange 64 for supporting said jacket on a supporting surface 65, with the lower end of said jacket being provided with openings 66 for the entrance of water into said jacket around the heating elements 60. As with the other embodiment shown, the heating elements 60 are closely spaced to the walls of the jacket 62 so that said elements only heat and vaporize at any one time a relatively small quantity of a main body of water in which the jacket 62 is inserted.

Although I have described and illustrated my heating elements and their associated jackets as being vertically oriented, it is to be understood, of course, that said elements and jackets may also have a horizontal orientation, but with said elements being closely spaced to the walls of their associated jackets and with said jackets being in open communication with a main body of water to be atomized and in open communication with the atmosphere to permit the vapor to exit said jackets.

I claim:

In a vaporizing humidifier,
(a) a tank for holding the water to be vaporized,
(b) a cover extending partially over the top of said tank and being open to the atmosphere for the discharge of water vapor from the humidifier,
(c) said tank and cover having outwardly projecting flanges having screw-receiving openings formed therein, said flanges being located in a plane intersecting the tank for mounting said tank and cover in open communication in a recessed position in a duct for discharging the vapor generated by said humidifier into said duct,
(d) at least one elongated jacket supported in the water in said tank and having open upper and lower ends disposed respectively above and below the water level in said tank, said open lower end permitting the water in the tank to flow freely into each jacket whereby each of said jackets and tank have a uniform water level,
(e) a plate supported within said tank and having an aperture for each of said jackets,
(f) an outwardly projecting shoulder on the upper end of each jacket carried on the upper face of said plate for supporting the jacket in one of the apertures in said plate,
(g) an elongated heating element carried in each jacket and occupying a substantial portion thereof to dispose said heating element along its entire length in uniformly closely spaced relation to the inner wall of the jacket for heating and vaporizing the water entering each of the jackets through the open lower ends thereof,
(h) means extending between each of said jackets and the heating elements therein for retaining said heating element in said closely spaced relation to said inner wall, and
(i) means for supporting power to said heating elements.

References Cited by the Examiner

UNITED STATES PATENTS

| 1,430,548 | 10/1922 | Hogue | 219—273 |
| 1,668,707 | 5/1928 | Allen | 219—315 |
| 1,749,969 | 3/1930 | Brodin | 219—325 |
| 1,909,973 | 5/1933 | Lewis et al. | 219—272 |
| 1,992,279 | 2/1935 | Arni et al. | 219—244 X |
| 2,213,851 | 9/1940 | Shaw et al. | 219—275 |
| 2,454,657 | 11/1948 | Kuzmin et al. | 219—276 |
| 2,763,765 | 9/1956 | Duberstein et al. | 219—275 |
| 2,847,547 | 8/1958 | Gordon | 219—273 |
| 3,081,393 | 3/1963 | Wohl | 219—272 |

FOREIGN PATENTS

| 372,675 | 3/1923 | German. |
| 383,677 | 11/1932 | Great Britain. |

RICHARD M. WOOD, *Primary Examiner.*

ANTHONY BARTIS, *Examiner.*